United States Patent
Bedell et al.

(10) Patent No.: US 7,770,283 B2
(45) Date of Patent: Aug. 10, 2010

(54) METHOD OF FABRICATING A MAGNETIC HEAD

(75) Inventors: Daniel Wayne Bedell, Gilroy, CA (US); Vladimir Nikitin, Campbell, CA (US); Aron Pentek, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1225 days.

(21) Appl. No.: 11/347,356

(22) Filed: Feb. 3, 2006

(65) Prior Publication Data

US 2007/0183092 A1 Aug. 9, 2007

(51) Int. Cl.
*G11B 5/127* (2006.01)
*H04R 31/00* (2006.01)

(52) U.S. Cl. .............. 29/603.16; 29/603.07; 29/603.13; 29/603.14; 29/603.15; 29/603.18; 205/199; 205/122; 216/62; 216/65; 216/66; 360/121; 360/122; 360/317; 451/5; 451/41

(58) Field of Classification Search .............. 29/603.07, 29/603.13–603.16, 603.18; 205/199, 122; 216/62, 66, 67; 360/121, 122, 317; 451/5, 451/41

See application file for complete search history.

(56) References Cited

U.S. PATENT DOCUMENTS

| 5,901,432 A | 5/1999 | Armstrong et al. |
| 6,278,591 B1 | 8/2001 | Chang et al. |
| 6,694,604 B2 | 2/2004 | Santini |
| 6,723,252 B1 * | 4/2004 | Hsiao et al. .................. 216/22 |
| 6,742,241 B1 | 6/2004 | Sasaki |
| 6,747,850 B1 | 6/2004 | Chang et al. |
| 2002/0023338 A1 | 2/2002 | Seigler et al. |

* cited by examiner

*Primary Examiner*—Paul D Kim
(74) *Attorney, Agent, or Firm*—Zilka-Kotab, PC

(57) ABSTRACT

A multi-step process for notching the P1 pole of the write head element of a magnetic head. In a first step following the fabrication of the P2 pole tip, a layer of protective material is deposited on the approximately vertical side surfaces of the P2 pole tip. Thereafter, a first ion milling step, utilizing a species such as argon, is performed to mill through the write gap layer and to notch into the P1 pole layer therebelow. The removal of redeposited material from the side surfaces of the P2 pole tip is thereafter accomplished and the protective material formed on the side surfaces of the P2 pole tip protects the P2 pole tip during the redeposition clean up step. Thereafter, the protective material is removed from the side surfaces of the P2 pole tip, and a second ion milling step is performed to further notch the P1 pole material.

21 Claims, 8 Drawing Sheets

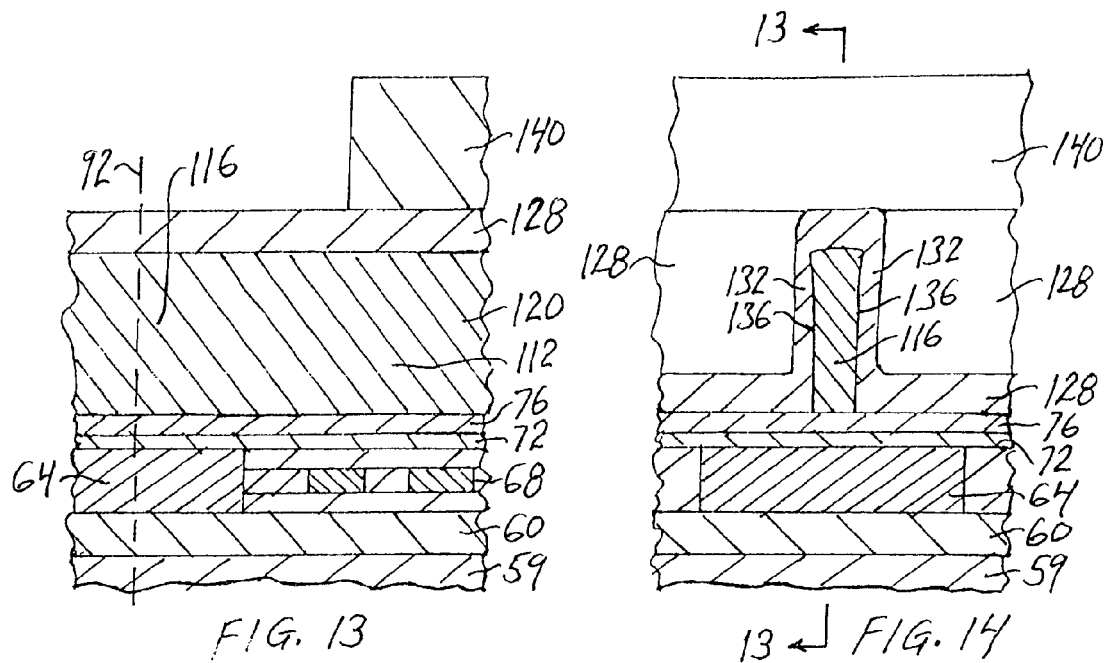
FIG. 13
FIG. 14
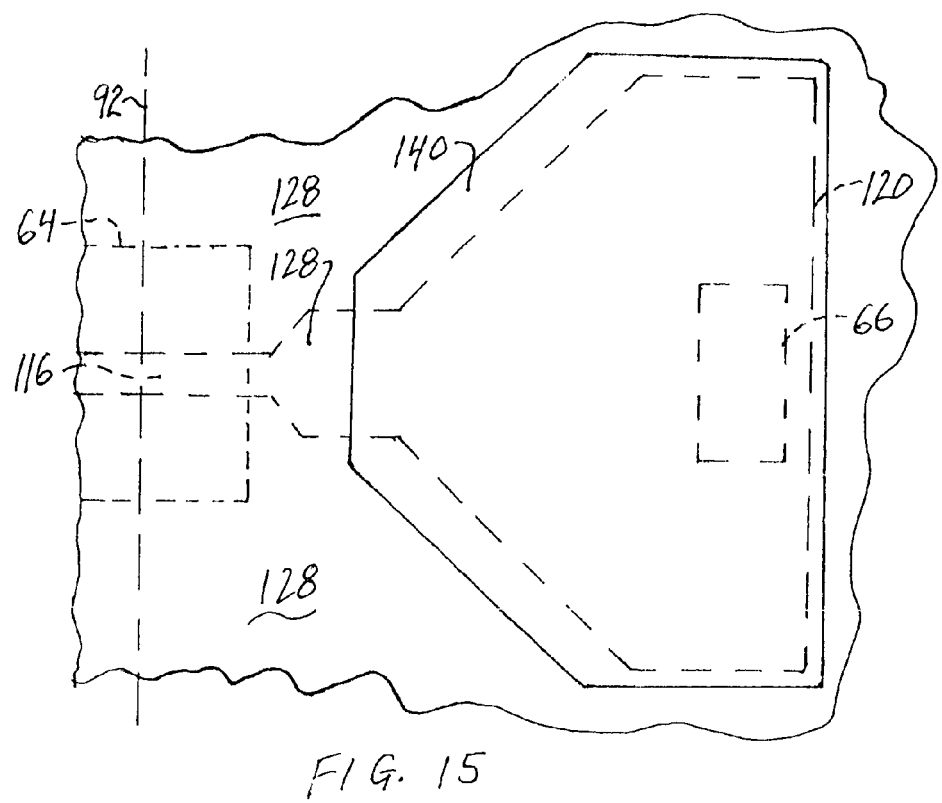
FIG. 15

METHOD OF FABRICATING A MAGNETIC HEAD

BACKGROUND OF THE INVENTION

1. Field of the Invention

The present invention relates generally to methods for fabricating magnetic heads, and more particularly to methods for notching the P1 magnetic pole of such magnetic heads.

2. Description of the Prior Art

One approach to increasing the areal data storage density of magnetic disks is to narrow the width of the data tracks written on the disks, such that more tracks per inch can be written, and therefore more data stored on the disk in a given area. However, it is also necessary to provide some spacing between adjacent tracks, and the spacing required between data tracks is a function of the strength of the fringing magnetic fields that are created by the magnetic head. Such fringing fields induce unwanted side writing from the magnetic head. Generally, the width of the base of the P2 magnetic pole tip determines the width of the written data track. As the width of the base of the P2 pole has been reduced, in order to produce narrower track widths, the effect of side writing has become more pronounced in relation to the narrowed track widths. Therefore, it is desirable to minimize the fringing fields generated by magnetic heads, such that adjacent data tracks can be written more closely together, and the areal data storage density on the disk thereby increased.

One of the fabrication methods that has been undertaken in the prior art to reduce the fringing fields is to notch the P1 magnetic pole, as is known to those skilled in the art. Such P1 pole notching can substantially reduce the fringing magnetic fields generated by the magnetic head, and can thereby ultimately increase the areal data storage density on the disk. The standard P1 notching process of the prior art utilizes the previously fabricated P2 pole tip as an etching mask element in the notching process, and the process includes first etching through the write gap layer, typically alumina ($Al_2O_3$), and then etching into the P1 pole layer (typically Permalloy, a NiFe compound). A problem that initially exists in the prior art P1 notching process that utilizes an argon ion beam is that the alumina write gap layer is significantly more resistant to etching by the argon ion beam than the NiFe material of the P2 pole tip and the P1 layer. Therefore, where an argon ion beam was used in the prior art to conduct the P1 notching step, significant portions of the P2 pole tip were etched away while the beam more slowly etched through the alumina write gap layer. Thereafter, further portions of the P2 pole tip were etched away while the P1 pole was subsequently notched by the ion beam. As a result, the earlier prior art P1 pole notching process required the initial fabrication of a rather thick and wide P2 pole tip, such that a properly sized P2 pole tip remained following the etching in the P1 notching step utilizing an argon ion beam.

With the continuing emphasis on increasing the data areal data storage density, further refinements in the P1 pole notching process are required to reduce side writing from the magnetic head. The magnetic head of the present invention with its improved P1 pole notching method provides such a side writing reduction.

SUMMARY OF THE INVENTION

The present invention includes a multi-step process for notching the P1 pole of the write head element of a magnetic head. In a first step following the fabrication of the P2 pole tip, a layer of protective material is deposited upon the magnetic head surfaces such that portions of the protective material layer are formed on the approximately vertical side surfaces of the P2 pole tip. Thereafter, a reactive ion etching step is performed utilizing reactive species that preferentially remove portions of the protective material. Due to the strong directionality of the RIE process, the protective material is removed from horizontal surfaces, whereas the protective material formed on the approximately vertical side surfaces of the P2 pole tip is not removed. Following the first RIE step a first ion milling step, utilizing a species such as argon, is performed to mill through the write gap layer and to notch into the P1 pole layer therebelow. The removal of redeposited material from the side surfaces of the P2 pole tip is thereafter accomplished and the protective material formed on the side surfaces of the P2 pole tip protects the P2 pole tip during the redeposition clean up step. Thereafter, a second RIE step is performed to remove the protective material from the side surfaces of the P2 pole tip. Thereafter, a second ion milling step is performed to further notch the P1 pole material. This multi-step P1 pole notching process creates a deeper notching of the P1 pole with minimal detrimental milling of the side surfaces of the P2 pole tip. As a result, the width of the P2 pole tip is more accurately controlled than before, and side writing from the P2 pole tip is reduced.

It is an advantage of the P1 pole notching process of the present invention that better P2 pole tip width control is obtained.

It is another advantage of the P1 pole notching process of the present invention that it provides better protection of the side surfaces of the P2 pole tip.

It is a further advantage of the P1 pole notching process of the present invention that it provides reduced side writing from the magnetic head.

It is an advantage of the magnetic head of the present invention that it has reduced fringing magnetic fields.

It is another advantage of the magnetic head of the present invention that the areal data storage density on hard disks can be increased.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIG. 13 is a side cross-sectional view of a further fabrication step of the magnetic head depicted in FIG. 11;

FIG. 14 is an end cross-sectional view taken from the location of the future air bearing surface as shown in FIG. 13;

FIG. 15 is a top plan view of the P2 pole as fabricated in FIGS. 13 and 14;

DETAILED DESCRIPTION OF THE PREFERRED EMBODIMENTS

Figure 1:
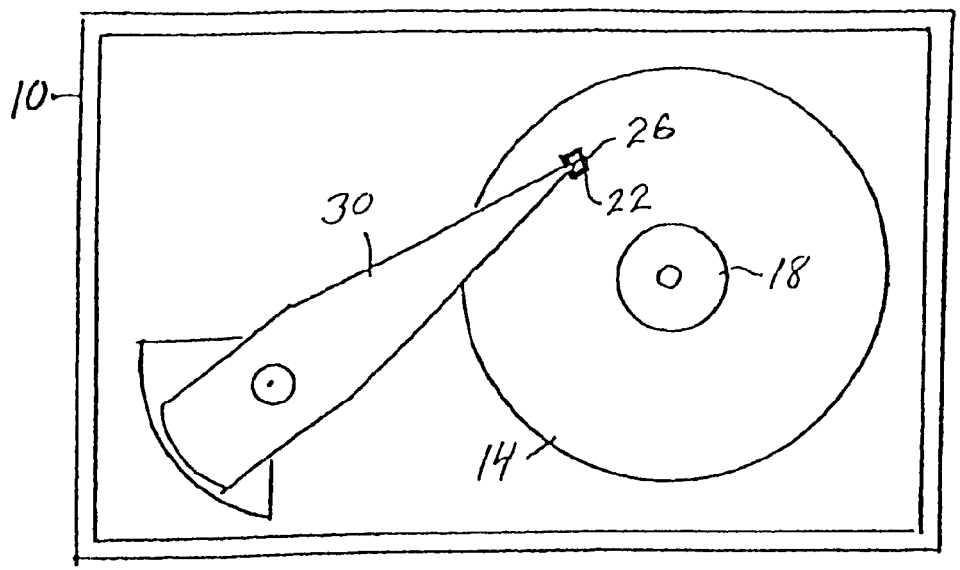
FIG. 1 is a schematic top plan view of a hard disk drive including the magnetic head of the present invention.

Efforts to increase areal data storage density of hard disk drives have lead to improvements in the structure and function of the write head elements of magnetic heads. A simplified top plan view of a typical hard disk drive 10 which is suitable to include the magnetic head of the present invention is presented in FIG. 1. As depicted therein, at least one hard disk 14 is rotatably mounted upon a motorized spindle 18. A slider 22, having a magnetic head 26 disposed thereon, is mounted upon an actuator arm 30 to fly above the surface of each rotating hard disk 14. A typical hard disk drive 10 may include a plurality of disks 14 that are rotatably mounted upon the spindle 18 and a plurality of actuator arms 30 having one or more magnetic heads 26 mounted upon the actuator arm. As is well known to those skilled in the art, when the hard disk drive 10 is operated, the hard disk 14 rotates upon the spindle 18 and the magnetic head 26 acts as an air bearing slider 22 that is adapted for flying above the surface of the rotating disk. The slider includes a substrate based upon which various layers and structures that form the magnetic head are fabricated. Such heads are fabricated in large quantities upon a wafer substrate and subsequently sliced into discrete sliders 22, each including a magnetic head 26. The present invention includes improved features and manufacturing methods for such magnetic heads 26, and to better describe the present invention a prior art magnetic head is first described.

Figure 2:
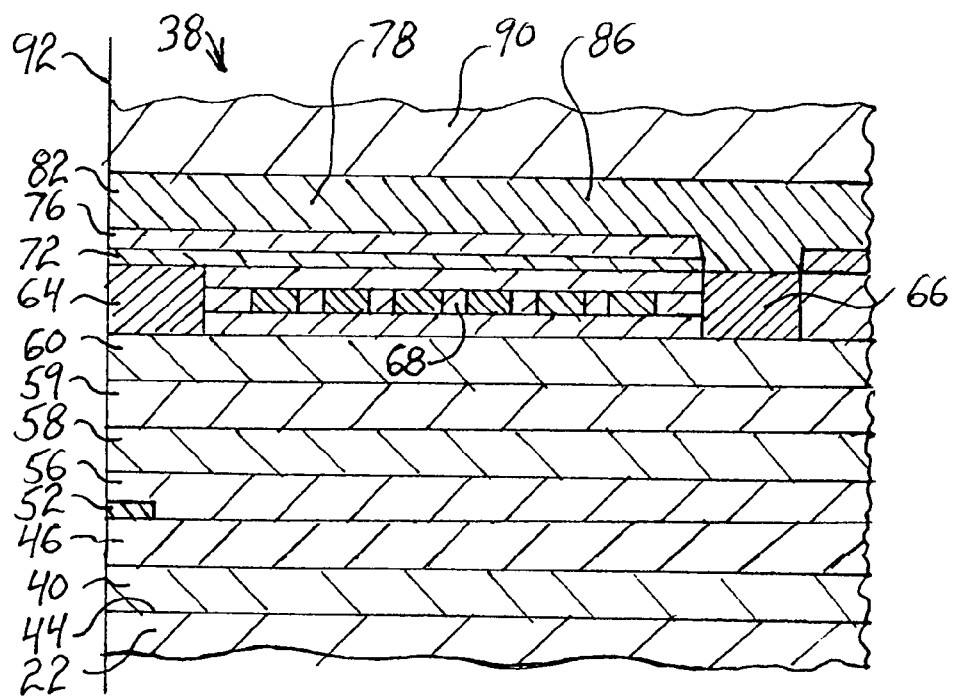
FIG. 2 is a side cross-sectional view depicting various components of a prior art magnetic head.

As will be understood by those skilled in the art, FIG. 2 is a side cross sectional view depicting portions of a prior art magnetic head 38. The magnetic head 38 includes a first magnetic shield layer (S1) 40 that is formed upon a surface 44 of the slider body material 22. A first insulation layer (G1) 46 is formed on the S1 shield 40 and a read head sensor element 52 is formed on the G1 layer 46. A second insulation layer (G2) 56 is formed on the sensor 52, and a second magnetic shield layer (S2) 58 is formed upon the G2 insulation layer 56. An electrical insulation layer 59 is then deposited upon the S2 shield 58, and a first magnetic pole (P1) 60 is fabricated upon the insulation layer 59.

Following the fabrication of the P1 layer 60, a P1 pole pedestal 64 and a back gap piece 66 are fabricated upon the P1 layer 60, and an induction coil 68 is fabricated within insulation above the P1 layer within the layer that includes the P1 pole pedestal 64. A write gap layer 72 is next deposited followed by a P2 pole electroplating seed layer 76. A P2 magnetic pole 78 including a P2 pole tip 82 and a P2 magnetic pole yoke 86 are subsequently fabricated above the write gap layer, typically utilizing photolithographic and electroplating techniques. Typically, the write gap layer is comprised of alumina ($Al_2O_3$) and the P1 pole layer 60, P1 pole pedestal 64, P2 pole 78 and P2 pole tip 82 are composed of a NiFe compound such as Permalloy (NiFe 80/20). A P1 pole notching step is next conducted, as is described in detail hereinbelow. The head is subsequently encapsulated in alumina 90 and fabricated such that an air bearing surface (ABS) 92 is created. There are many detailed fabrication steps to create the magnetic head that are well known to those skilled in the art, and which are not deemed necessary to describe herein in order to provide a full understanding of the present invention. The prior art P1 pole notching process is next discussed with the aid of FIG. 3, such that the improved P1 pole notching process of the present invention can be better understood.

Figure 3:
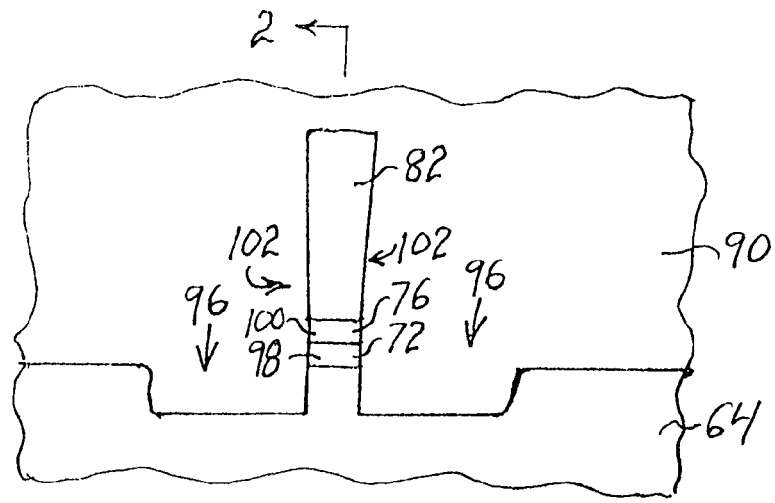
FIG. 3 is an elevational view taken from the air bearing surface of the magnetic head depicted in FIG. 2, wherein cross-sectional lines 2-2 are provided to indicate the relationship between FIGS. 2 and 3.

FIG. 3 is an elevational view taken from the air bearing surface of the magnetic head depicted in FIG. 2, wherein cross-sectional lines 2-2 are provided to indicate the relationship between FIGS. 2 and 3. In manufacturing the prior art magnetic head depicted in FIG. 3, the P1 pole pedestal 64 and induction coil 68 are fabricated, followed by the write gap layer 72 that typically has a thickness of approximately from 900 Å to 3,000 Å, depending upon the size of the data bits, and therefore the bits per inch (BPI) areal density to be written by the magnetic head 10. The P2 pole seed layer 76 having a thickness of approximately 800 Å is deposited upon the write gap layer 72, and the P2 pole 78 including the P2 pole tip 82 is subsequently plated onto the seed layer 76. In fabricating the P2 pole 78 a P2 pole trench (not shown) is formed in a photolithographic resist layer (not shown), that is created to plate up the P2 pole. The resist layer will then typically have a thickness of approximately 4.5 microns. After the P2 pole 78 has been plated up within the photoresist trench, the photoresist is removed using a wet chemical removal process. Then, using ion beam milling techniques with suitable masking techniques, the P2 pole tip area is milled using the P2 pole tip 82 as part of the milling mask, such that the seed layer 76, write gap layer 72 and portions of the P1 pole pedestal are removed to create the notches 96, as depicted in FIG. 3. Typically, the depth of notching is approximately 1.5 to 2 write gap thicknesses. The portions 98 and 100 of the write gap layer and seed layer respectively located beneath the P2 pole tip 82 are not removed due to the shielding thereof by the P2 pole tip.

The ion milling process is typically conducted at an angle of approximately 10° from normal to perform the material milling process, and subsequently at an angle of approximately 70° from normal to clean up material that becomes redeposited along the sides 102 of the write gap layer 98, seed layer 100 and P2 pole tip 82 during the etching process. This necessary removal of redeposited material can present a problem, because the P2 pole tip width is typically reduced by the milling to remove the redeposited material, and it is difficult to control this important P2 pole tip width dimension.

The milling process step that is undertaken to notch the P1 pole also significantly reduces the thickness of the initially plated P2 pole tip. Specifically, as depicted in FIG. 2, where the initially plated P2 pole tip 82 has a thickness of approximately 4 microns, as a result of the milling step an upper portion of the P2 pole tip is milled away, such that the thickness of the remaining portion of the P2 pole tip may be approximately 2.5 microns. It is important to note that while this prior art P1 pole notching process has been described as a notching of a P1 pole pedestal, this notching process is also commonly performed where a P1 pole without a P1 pole pedestal is fabricated, and the notching is conducted into the P1 pole surface.

Figure 4:
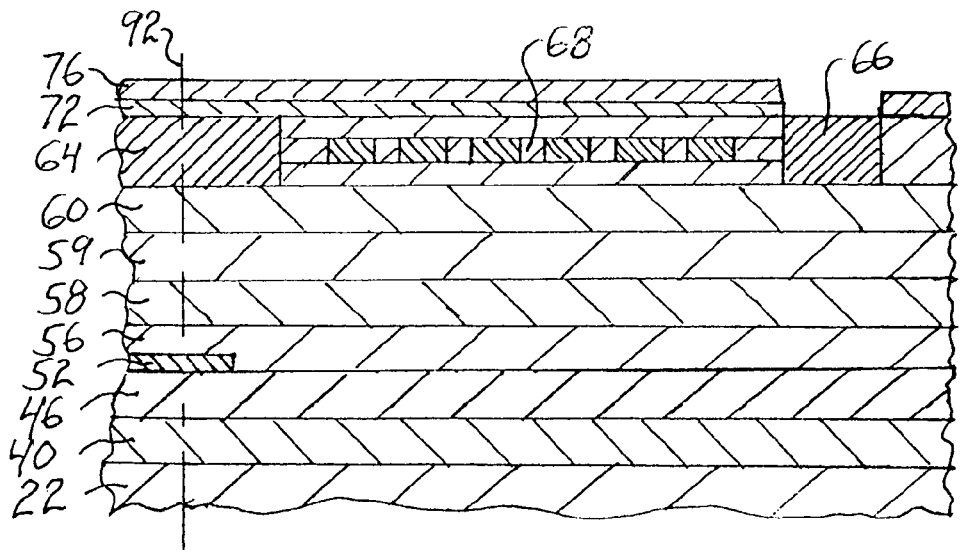
FIG. 4 is a side cross-sectional view of a portion of the prior art magnetic head depicted in FIG. 2.
Figure 5:
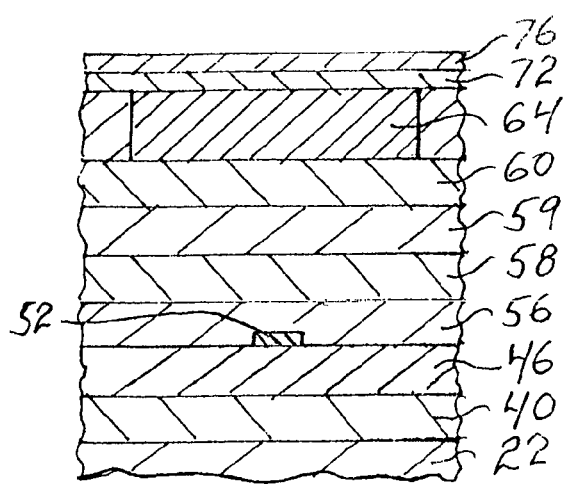
FIG. 5 is an end cross-sectional view taken from the location of the future air bearing surface as shown in FIG. 4.

The fabrication process for a magnetic head of the present invention will be described by starting with a point in the fabrication process that is depicted in FIGS. 4 and 5, wherein FIG. 4 is a side, cross-sectional view of a portion of the prior art magnetic head depicted in FIG. 2, and FIG. 5 is an end cross-sectional view taken from the location of the future ABS surface as shown in FIG. 4. As depicted in FIGS. 4 and 5, the magnetic head includes the first magnetic shield 40 that is fabricated upon the substrate 22, the first insulation layer 46, the sensor 52, the second insulation layer 56, the second magnetic shield 58, the insulation layer 59, the first magnetic pole layer 60, the first magnetic pole pedestal 64, the induction coil structure 68, the back gap piece 66 and the write gap layer 72 that is disposed above the P1 pedestal 64 and the induction coil structure 68.

Figure 6:
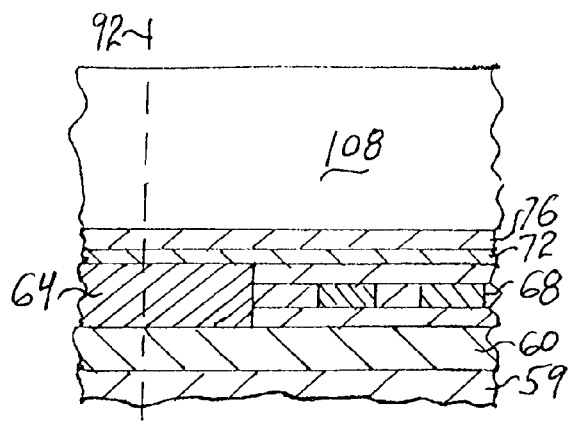
FIG. 6 is a side cross-sectional view of a further fabrication step of the prior art magnetic head depicted in FIG. 4.
Figure 7:
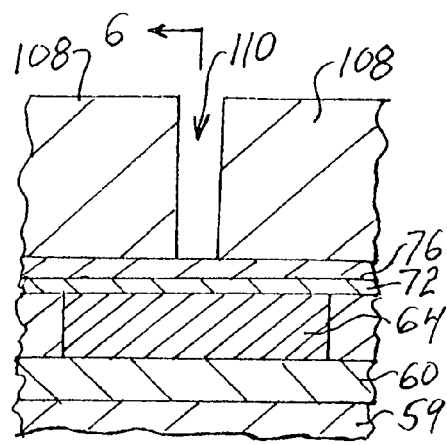
FIG. 7 is an end cross-sectional view taken from the location of the future air bearing surface as shown in FIG. 6.

As a first step in fabricating the second magnetic pole structure an electroplating seed layer 76 is deposited upon the write gap layer 72. The seed layer 76 is typically comprised of a magnetic material such as NiFe, as is well known to those skilled in the art. Thereafter, as depicted in FIGS. 6 and 7, wherein FIG. 6 is a side cross-sectional view and FIG. 7 is an end elevational view taken from the future ABS surface location, a photoresist 108 is deposited and patterned to create the P2 pole trench 110 in the place and location of the second magnetic pole. The second magnetic pole structure 112 is then plated up within the patterned photoresist. This stage in the fabrication process is depicted in FIGS. 8, 9 and 10, wherein FIG. 8 is a side cross-sectional view of a portion of the prior art magnetic head depicted in FIG. 6, FIG. 9 is an end cross-sectional view taken from the location of the future air bearing surface as shown in FIG. 8, and FIG. 10 is a top plan view of the P2 pole as fabricated in FIGS. 8 and 9.

Figure 8:
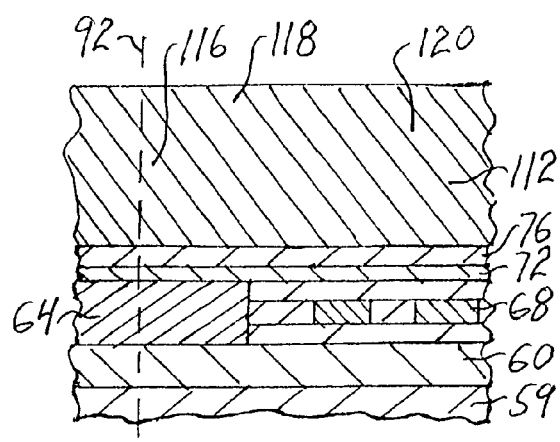
FIG. 8 is a side cross-sectional view of a further fabrication step of the prior art magnetic head depicted in FIG. 6.
Figure 9:
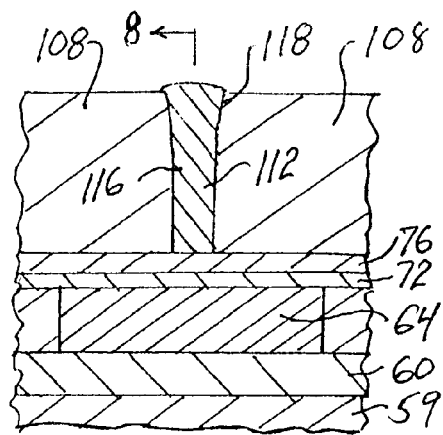
FIG. 9 is an end cross-sectional view taken from the location of the future air bearing surface as shown in FIG. 8.
Figure 10:
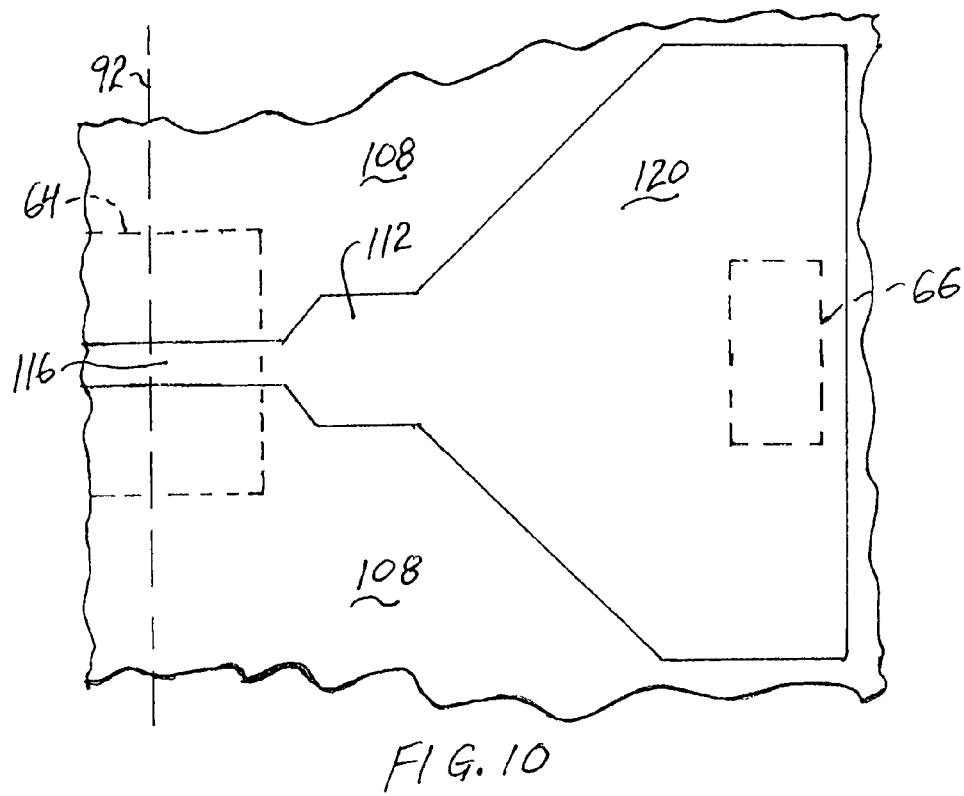
FIG. 10 is a top plan view of the P2 pole as fabricated in FIGS. 8 and 9.

As depicted in FIGS. 8, 9 and 10, the second magnetic pole structure 112 includes the P2 pole tip 116 and the larger yoke 120. A top portion 118 of the P2 pole structure 112, and particularly at the P2 pole tip 116 as depicted in FIG. 9, typically becomes flared outwardly, owing to the nature of photolithography that is conducted within a deep, narrow trench.

Figure 11:
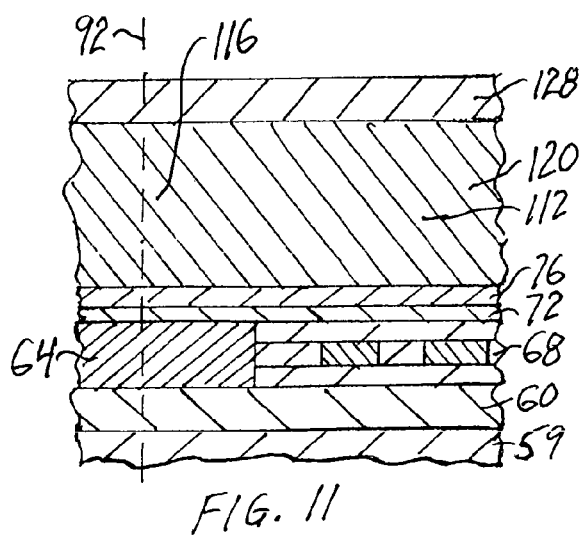
FIG. 11 is a side cross-sectional view of a fabrication step of the magnetic head of the present invention.
Figure 12:
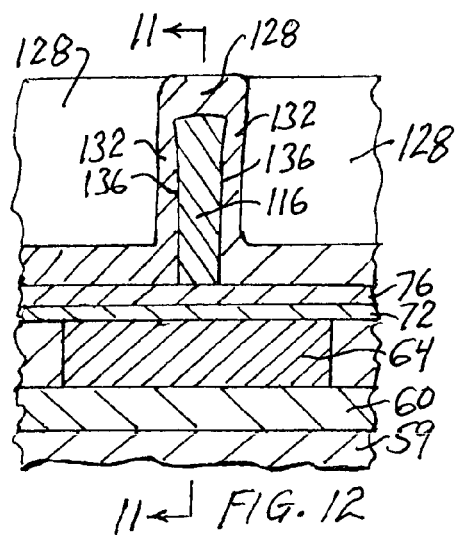
FIG. 12 is an end cross-sectional view taken from the location of the future air bearing surface as shown in FIG. 11.

As is next depicted in FIGS. 11 and 12, and as a first step in the fabrication process of the magnetic head of the present invention, the photoresist 108 is stripped away and a layer 128 of a protective material, such as alumina, is next deposited across the surface of the wafer and upon the P2 pole structure 112. Significantly, a portion 132 of the protective material is deposited upon the sides 136 of the P2 pole tip 116, as is best seen in FIG. 12. If a typical sputter deposition process is utilized, the protective material 128 will be deposited to a greater depth upon horizontal surfaces, such as the seed layer 76, as compared to more vertical surfaces, such as the sides 136 of the P2 pole tip. If a deposition process such as atomic layer deposition (ALD) is utilized, the thickness of the protective material 128 upon both horizontal and vertical surfaces will be approximately equal. The ALD process is preferred, though not necessary to the fabrication process of the present invention. The preferred protective material is alumina, although other materials that can be selectively etched in process steps described herebelow will be suitable. A desired thickness of the protective material deposited upon the sides 136 of the P2 pole tip is approximately 0.3 microns.

As is next seen in FIGS. 13, 14 and 15, a protective milling mask 140 is next fabricated to cover the upper yoke portions 120 of the P2 pole structure, where lower portions of the P2 pole including the P2 pole tip 116 are not covered by the mask. A suitable mask 140 may be comprised of a photoresist that is photolithographically patterned to create the mask.

Figure 16:
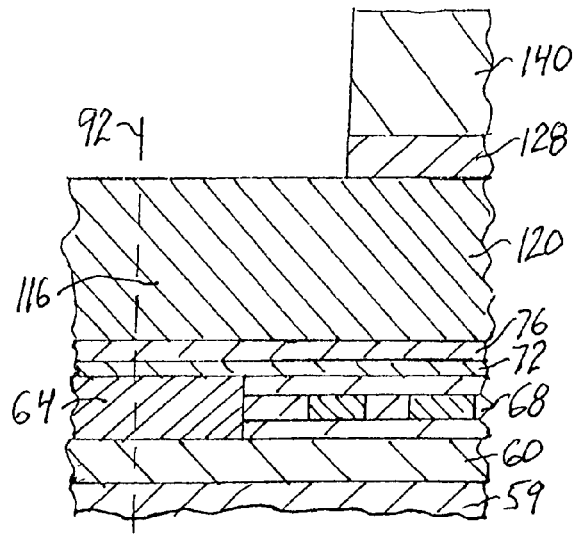
FIG. 16 is a side cross-sectional view of a further fabrication step of the magnetic head depicted in FIG. 13.
Figure 17:
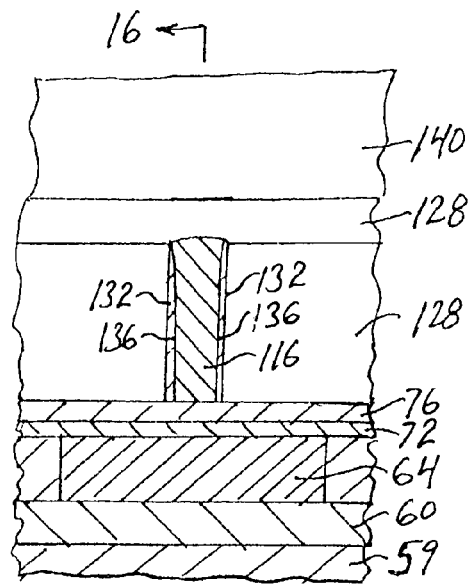
FIG. 17 is an end cross-sectional view taken from the location of the future air bearing surface as shown in FIG. 16.

A first etching step is next commenced in the process of notching the P1 pole. As depicted in FIGS. 16 and 17, the etch step is a reactive ion etch (RIE) process that is conducted utilizing ion species that preferably include fluorine or chlorine species that selectively etch alumina at a increased rate compared to the NiFe magnetic poles. Gasses such as $CHF_3$ or $C_2F_6$ are preferably utilized. The RIE process is conducted normally to the surface of the substrate, and because the RIE process is very directional, the alumina protective layer 128 on the exposed horizontal surfaces (such as seed layer 76) is removed, while the protective alumina 132 on the side surfaces 136 of the P2 pole tip remains.

Figure 18:
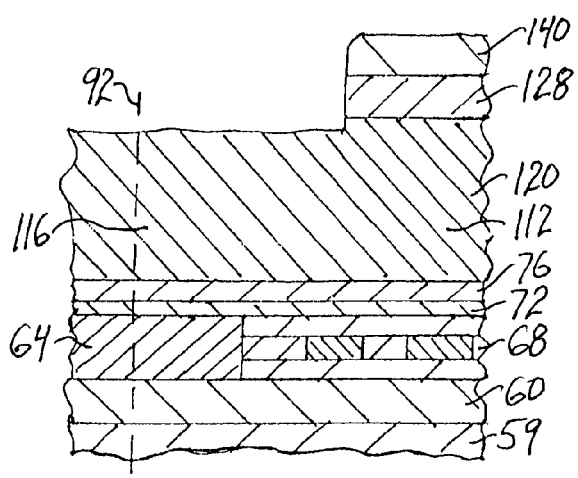
FIG. 18 is a side cross-sectional view of a further fabrication step of the magnetic head depicted in FIG. 16.
Figure 19:
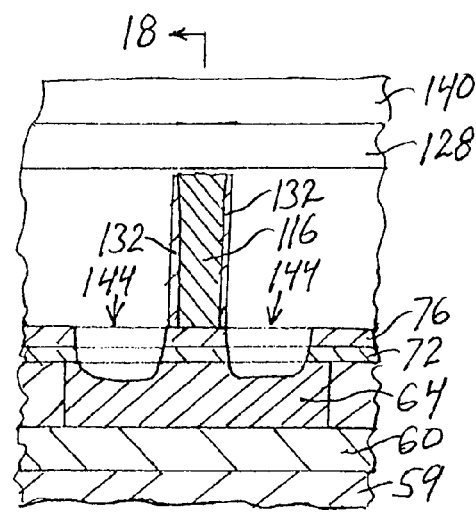
FIG. 19 is an end cross-sectional view taken from the location of the future air bearing surface as shown in FIG. 18.

Thereafter, as depicted in FIGS. 18 and 19, a standard ion milling step utilizing a gas such as argon, is conducted to create first P1 pole notches 144. The ion milling step involves standard masking (not shown) of pole areas, and results in the removal of the exposed seed layer 76, the exposed write gap layer 72 beneath the seed layer, and some milling into the surface of the P1 pole pedestal 64. In this first milling step, the redeposition of milled material typically occurs on the sides of the P2 pole tip; that is, upon the protective material 132. High angle ion milling is then utilized to remove the redeposited material, as is well known to those skilled in the art, and the protective material 132 protects the sides 136 of the P2 pole tip during the high angle redeposition clean up process step. This first milling step can typically be completed with one low angle (for example 15° from the normal to the surface of the wafer) ion milling step to mill through the seed layer, write gap layer and into the P1 pedestal material, followed by one high angle milling step (for example 70° from the normal to the surface of the wafer) to remove the redeposition material from the protective material 132 disposed on the P2 pole tip sides 136. Alternatively, the low angle milling step and high angle milling step can be alternated sequentially. It is therefore to be understood that the protective material 132 serves to protect the sidewalls 136 of the P2 pole tip 116 from unwanted sidewall milling during the first phase of the P1 pole notching process.

Figure 20:
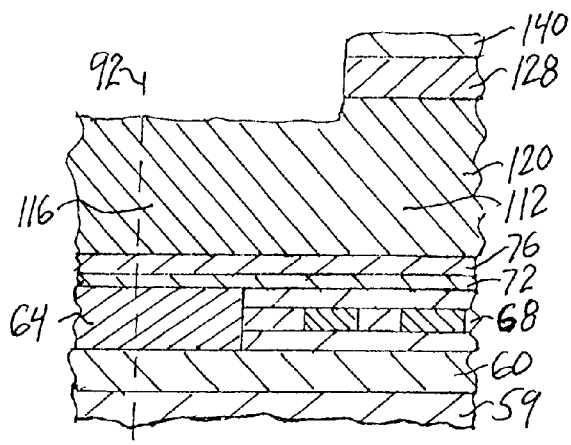
FIG. 20 is a side cross-sectional view of a further fabrication step of the magnetic head depicted in FIG. 18.
Figure 21:
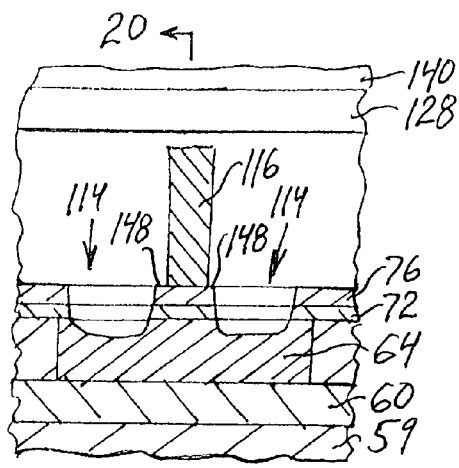
FIG. 21 is an end cross-sectional view taken from the location of the future air bearing surface as shown in FIG. 20.

As is depicted in FIGS. 20 and 21, the remaining protective material 132 is next removed from the sides 136 of the P2 pole tip 116. This is accomplished by again utilizing a reactive ion etch process step or a reactive ion milling step utilizing ions that selectively etch the protective material as compared to the magnetic pole material. Where the protective material is alumina, fluorine or chlorine ions may be utilized, and fluorine ions are preferred in the present invention. Therefore in this process step, gasses such as $CHF_3$ or $C_2F_6$ are preferably utilized to remove the alumina protective material 132. The milling or etching step is preferably conducted at an angle of between 10° and 60° from the normal to the surface of the wafer, and as can be seen in FIG. 21, when the protective material 132 is removed, an inner stepped portion 148 of the seed layer 76 and write gap layer 72 below it are now exposed.

Figure 22:
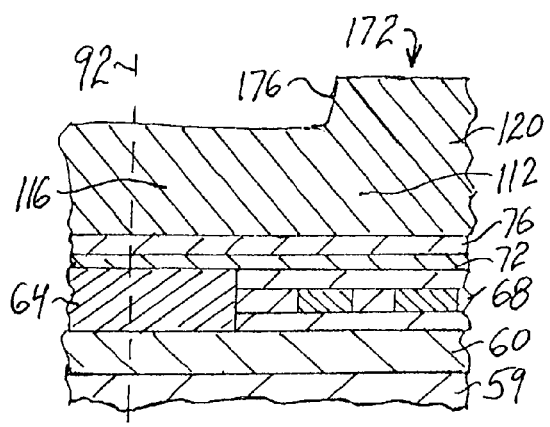
FIG. 22 is a side cross-sectional view of a further fabrication step of the magnetic head depicted in FIG. 20.
Figure 23:
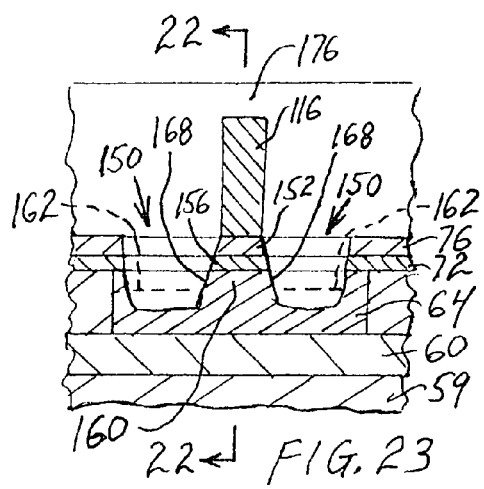
FIG. 23 is an end cross-sectional view taken from the location of the future air bearing surface as shown in FIG. 22.
Figure 24:
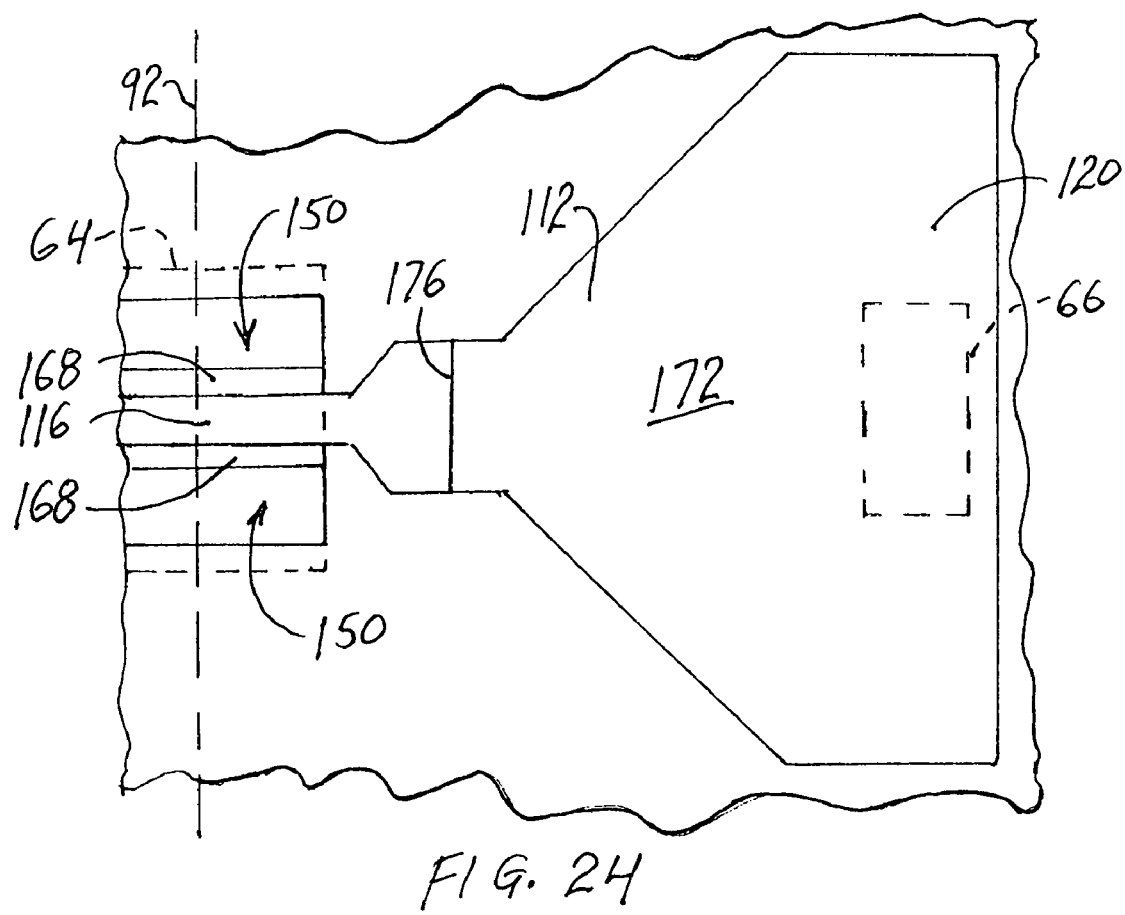
FIG. 24 is a top plan view of the P2 pole as fabricated in FIGS. 22 and 23.

As is depicted in FIGS. 22, 23 and 24, following the removal of the protective material 132 from the sides 136 of the P2 pole tip 116, a further ion milling step is undertaken to complete the notches 150 of the P1 pole notching process. This further P1 pole notching step is conducted utilizing typical ion milling process parameters, such as utilizing argon, to remove P1 pole pedestal material in a low angle milling and redeposited material in a high angle milling. As is best seen in FIG. 23, following this second milling step the P2 pole tip width is reduced only by a small amount as compared to the prior art as a result of the ion milling and the high angle redeposition clean up that is conducted. The unprotected stepped seed layer and write gap layer material in the stepped portion 148 is removed, such that only seed layer 152 and write gap layer 156 material that is protected by the P2 pole tip 116 remains. Further milling of the P1 pole pedestal occurs such that a protected portion 160 of the P1 pole pedestal 64 is created, having a thickness that is approximately 2 to 3 times the thickness of the write gap layer.

Because a significant amount of P1 pole pedestal material, the outer portion, was removed in the first ion milling step, the second ion milling step results in still further P1 pole material removal, such that the P1 pole notching depth achieved in the present invention is greater than that previously achieved. Specifically, a typical prior art notched P1 pole profile 162 is shown in a dashed line in FIG. 23. This dashed line 162 represents the typical prior art notched P1 pole surface following a typical prior art P1 pole notching process which utilizes a single ion milling step as is depicted in FIG. 3, and this is in contrast to the multi-step P1 pole notching process of the present invention as shown in FIG. 23. A shoulder 168 of the P1 pole notching of the present invention occurs as a result of the stepped 148 seed layer and write gap layer material (see FIG. 21) that remained after the first ion milling notching step where protection by the protective material 132 was in place. The shoulder occurs due to the additional thickness of seed layer and write gap layer material that exists proximate the base of the P2 pole tip at the start of the second ion milling step, and the sloped surface of the shoulder 168 is a result of preferential milling rates which occur at exposed edges, specifically the edge of the stepped seed layer 148, as compared to flat surfaces. In the preferred embodiment, the slope of the shoulder surface 168 is approximately 30° to 60° from normal to the substrate surface, and a preferred shoulder slope is approximately 45° from normal to the substrate surface. The shoulder 168 further reduces the incidence of side writing that may occur when the head is utilized by increasing the separation between the sides 136 of the P2 pole tip 116 and the P1 pole material within the notched P1 pole. This increases the magnetic reluctance between the sides of the P1 and P2, thus reducing the amount of fringing fields that cause the side writing.

At the start of the ion milling and the reactive ion etching process steps of the P1 pole notching process described hereabove (see FIG. 15), the upper yoke portion 120 of the P2 pole was protected by the photoresist mask 140, where an underlying layer of protective material 128 was deposited beneath it and upon the surface of the P2 pole. At the completion of the P1 pole notching process, however, the mask material 140 and the alumina protective material 128 will have been removed from the yoke 120 during the above described milling and etching process steps. However the thickness of the yoke in the masked area 172 will be substantially greater than the remaining thickness of the P2 pole tip 116 which has not been masked during the P1 pole milling and etching process steps. As is best seen in FIGS. 22 and 24, a shoulder 176 is formed at the reduced thickness of the P2 pole tip as compared to the yoke thickness. The shoulder is located away from the ABS surface location 92 a recessed distance at the thicker P2 pole yoke portion that was protected by the mask material. The shape of the P2 pole structure 116 from the thicker masked yoke portion 172 to the thinner P2 pole tip 116 creates a beneficial magnetic flux flow path from the yoke to the P2 pole tip. A recess distance of the shoulder 176 from the ABS 92 of from approximately 0.1 to approximately 0.7 microns is desirable, with a preferred recess distance of approximately 0.5 microns, where the remaining thickness of the P2 pole tip 116 is approximately 3 microns and the thickness of the masked, yoke portion 172 of the P2 pole is approximately 4.5 microns.

While the notching process of the present invention has been described in detail above as a notching of the P1 pole pedestal, the notching process can equally as well be performed upon a magnetic head that does not include a P1 pole pedestal where the notching is performed into the surface of the P1 pole.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What I claim is:

1. A method for fabricating a magnetic head, comprising: fabricating a P1 pole, a write gap layer and a P2 pole including a P2 pole tip and a yoke; notching said P1 pole including the following steps: fabricating a protective material layer upon all exposed portions of side surfaces of said P2 pole tip; milling to remove portions of said write gap layer and portions of said P1 pole; and removing said protective material layer from said side surfaces of said P2 pole tip; and milling further portions of said write gap layer and said P1 pole to create a notched P1 pole.

2. The method for fabricating a magnetic head as described in claim 1 wherein said step of fabricating the protective material layer upon the side surfaces of said P2 pole tip includes depositing a layer of the protective material on exposed horizontal magnetic head surfaces and upon said side surfaces of said P2 pole tip, and etching the protective material from said horizontal surfaces.

3. The method for fabricating a magnetic head as described in claim 2 wherein said etching is a reactive ion etching process.

4. The method for fabricating a magnetic head as described in claim 3 wherein said protective material is comprised of alumina and said reactive ion etching is conducted using chlorine or fluorine species.

5. The method for fabricating a magnetic head as described in claim 1 wherein said P1 pole further includes a P1 pole pedestal, and wherein said notching is formed into an upper surface of said P1 pole pedestal.

6. The method for fabricating a magnetic head as described in claim 1 wherein said step of milling further portions of said write gap layer and said P1 pole includes milling utilizing argon species, and wherein said milling is conducted at a low angle and at a high angle to remove redeposited material from said protective material layer.

7. The method for fabricating a magnetic head as described in claim 1 wherein said step of removing said protective material layer from said side surfaces of said P2 pole tip includes etching said protective material from said side surfaces of said P2 pole tip.

8. The method for fabricating a magnetic head as described in claim 7 wherein said etching said protective material from said side surfaces of said P2 pole tip is a reactive ion etching process.

9. The method for fabricating a magnetic head as described in claim 8 wherein said protective material is comprised of alumina and said reactive ion etching is conducted using chlorine or fluorine species.

10. The method for fabricating a magnetic head as described in claim 1 wherein said step of milling further portions of said write gap layer and P1 pole results in the formation of a sloped shoulder comprised of P1 pole material that is disposed proximate said P2 pole tip.

11. The method for fabricating a magnetic head as described in claim 10 wherein said sloped shoulder has an angle of 30° to 60° from normal to a P1 pole layer surface.

12. The method for fabricating a magnetic head as described in claim 11 wherein said sloped shoulder has an angle of approximately 45° from normal to said P1 pole layer surface.

13. The method for fabricating a magnetic head as described in claim 1 wherein said step of fabricating the protective material layer upon the side surfaces of said P2 pole tip includes depositing a layer of the protective material on exposed horizontal magnetic head surfaces and upon said side surfaces of said P2 pole tip, and etching the protective material from said horizontal surfaces.

14. The method for fabricating a magnetic head as described in claim 1 wherein said P1 pole further includes a P1 pole pedestal, and wherein said notching is formed into an upper surface of said P1 pole pedestal.

15. The method for fabricating a magnetic head as described in claim 1 wherein said step of milling to remove portions of said write gap layer and portions of said P1 pole includes milling utilizing argon species, and wherein said milling is conducted at a low angle and at a high angle to remove redeposited material from said protective material layer.

16. A method for fabricating a magnetic head, comprising: fabricating a P1 pole, a write gap layer and a P2 pole including a P2 pole tip and a yoke; notching said P1 pole including the following steps: fabricating a protective material layer upon side surfaces of said P2 pole tip; milling to remove portions of said write gap layer and portions of said P1 pole; and removing said protective material layer from said side surfaces of said P2 pole tip; milling further portions of said write gap layer and said P1 pole to create a notched P1 pole, and fabricating a mask upon a portion of the yoke of said P2 pole prior to said step of milling to remove portions of said write gap layer and portions of said P1 pole.

17. A method for fabricating a magnetic head, comprising: fabricating a P1 pole, a write gap layer and a P2 pole including a P2 pole tip and a yoke; notching said P1 pole including the following steps: fabricating a protective material layer upon side surfaces of said P2 pole tip, including depositing a layer of the protective material on exposed horizontal magnetic head surfaces and upon all exposed portions of said side surfaces of said P2 pole tip; etching the protective material from said horizontal surfaces; milling to remove portions of said write gap layer and portions of said P1 pole; and removing said protective material layer from said side surfaces of said P2 pole tip; and milling further portions of said write gap layer and said P1 pole to create a notched P1 pole, including formation of a sloped shoulder comprised of P1 pole material that is disposed proximate said P2 pole tip.

18. The method for fabricating a magnetic head as described in claim 14 wherein said protective material is comprised of alumina and said etching is a reactive ion etching process conducted using chlorine or fluorine species.

19. The method for fabricating a magnetic head as described in claim 17 wherein said sloped shoulder has an angle of 30° to 60° from normal to said P1 pole.

20. The method for fabricating a magnetic head as described in claim 17 further comprising a step of fabricating a mask upon a portion of the yoke of said P2 pole prior to said step of milling to remove portions of said write gap layer and portions of said P1 pole.

21. The method for fabricating a magnetic head as described in claim 17 wherein said P1 pole further includes a P1 pole pedestal, and wherein said notching is formed into an upper surface of said P1 pole pedestal.

* * * * *